Oct. 9, 1951 L. BROCK 2,570,517
OVEN DOOR CONSTRUCTION
Original Filed Jan. 21, 1946 3 Sheets-Sheet 1

Inventor
Lynmar Brock
By
Attorneys.

Oct. 9, 1951 L. BROCK 2,570,517
OVEN DOOR CONSTRUCTION
Original Filed Jan. 21, 1946 3 Sheets-Sheet 2
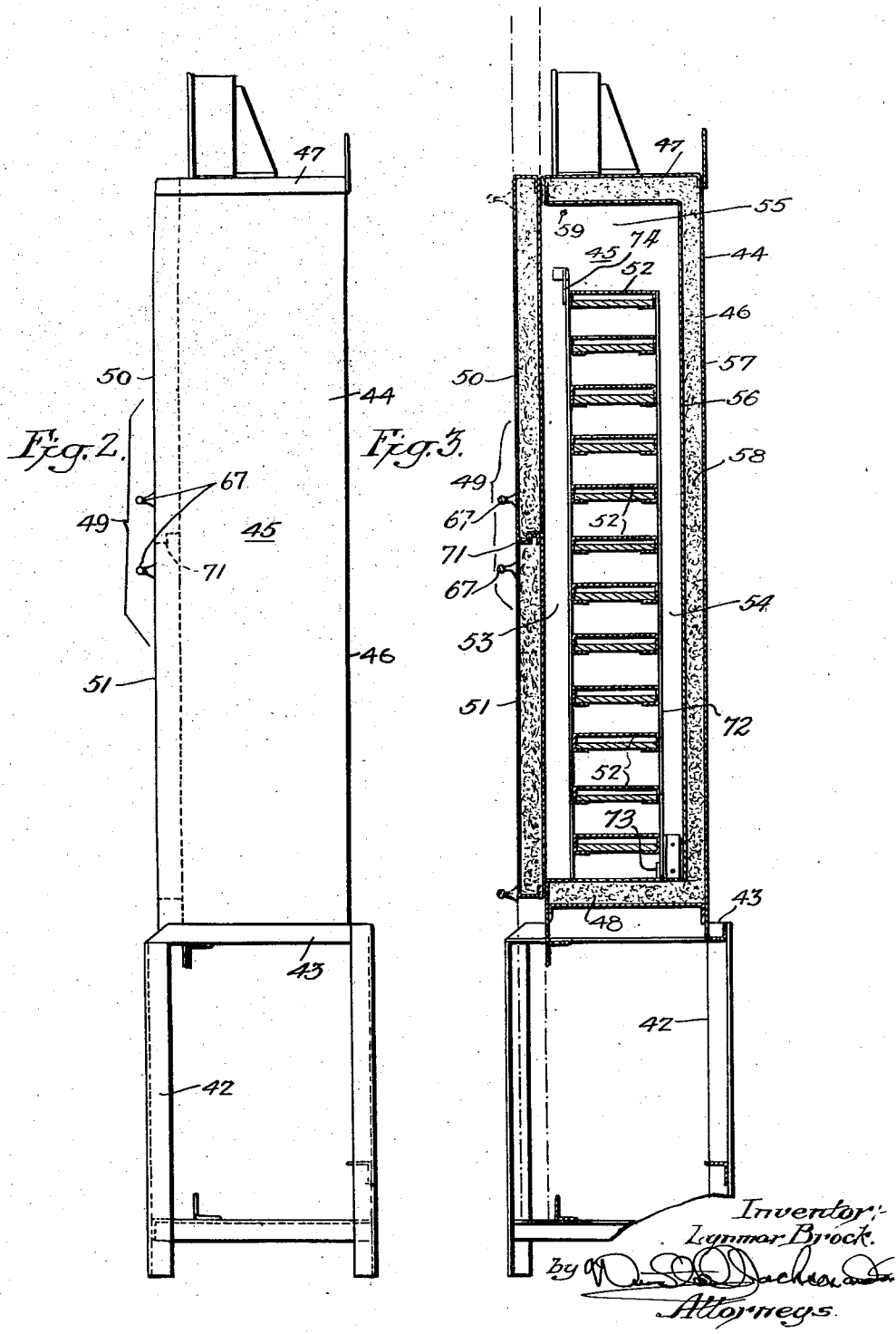

Oct. 9, 1951        L. BROCK        2,570,517
OVEN DOOR CONSTRUCTION
Original Filed Jan. 21, 1946        3 Sheets-Sheet 3
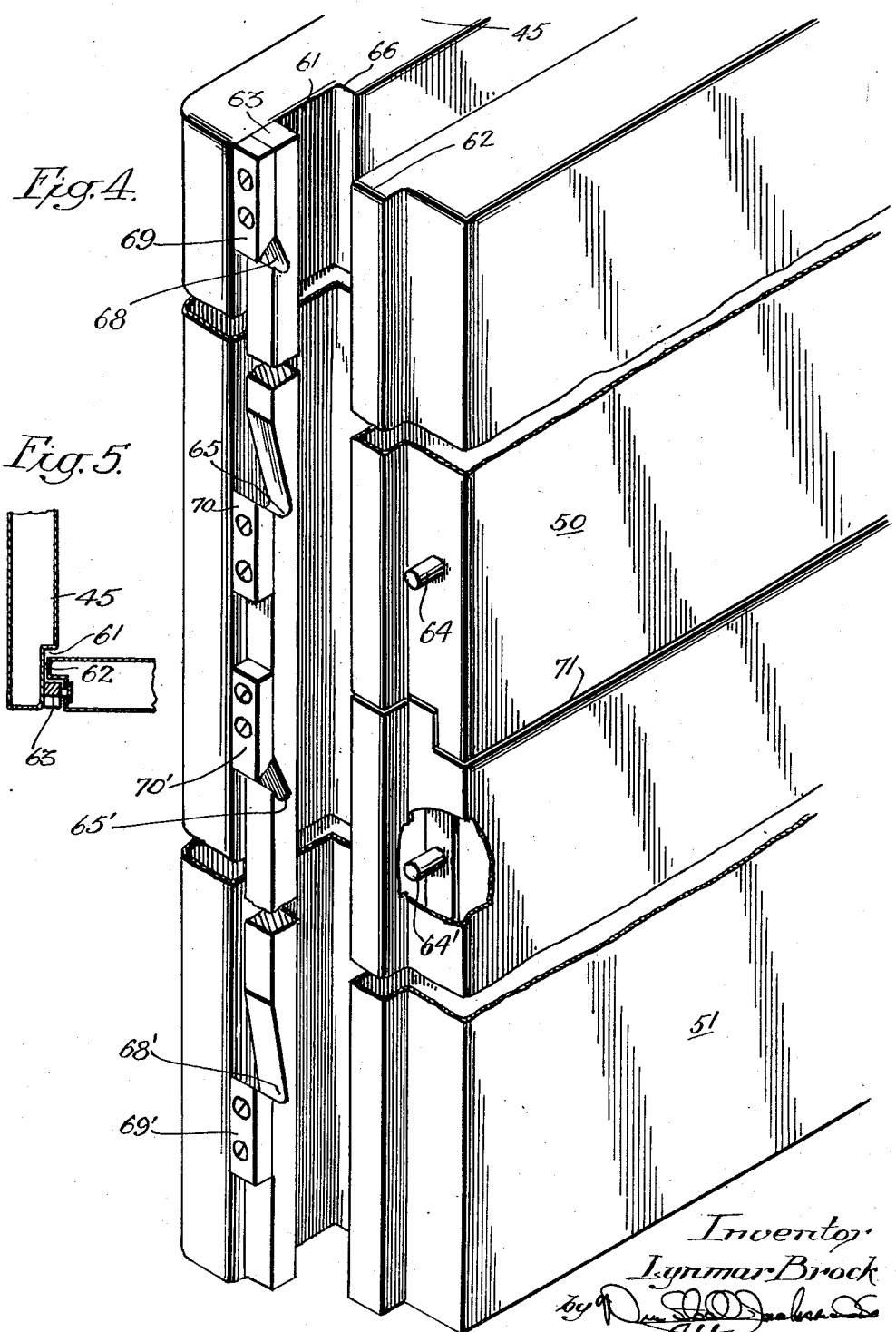

Patented Oct. 9, 1951

2,570,517

UNITED STATES PATENT OFFICE 2,570,517

OVEN DOOR CONSTRUCTION

Lynmar Brock, Philadelphia, Pa.

Application March 24, 1947, Serial No. 736,859, which is a division of application Serial No. 642,455, January 21, 1946. Divided and this application December 19, 1947, Serial No. 792,803

1 Claim. (Cl. 126—190)

The present invention relates to oven construction, and particularly to improvements in oven door structure.

The present invention is a division of Serial No. 736,859, filed March 24, 1947, now Patent 2,552,143, May 8, 1951, for Oven, which is itself a division of Serial No. 642,455, filed January 21, 1946, now abandoned, for Process and Apparatus for Preparing and Dispensing Food.

A purpose of my invention is to simplify and improve the construction of oven doors used on ovens of the type which reheat and complete the cooking of food which has been prepared, partially cooked, served in individual servings and refrigerated for dispensing at points remote from the point of cooking.

A further purpose is to employ an oven for heating and final cooking of food in which there are two door sections one above the other with a vertical guideway in which the sections are free to move up and down, with means suitably of pin and slot character for locking the upper section alternatively in lower and upper positions and the lower section alternatively in lower and upper portions.

In the drawings I have chosen to illustrate one form only which my invention may assume with slight modifications, the form being chosen as a convenient means of illustration.

Figure 2 is a right end elevation of Figure 1.

Figure 3 is a section of Figure 1 on line 3—3.

Figure 4 is an enlarged perspective view showing door guideways and slots with the door rotated 90° so that its end is visible in the same plane as the guideway inside at right angles.

Figure 5 is a fragmentary horizontal section through the oven at a corner where the door is attached.

Figure 1:
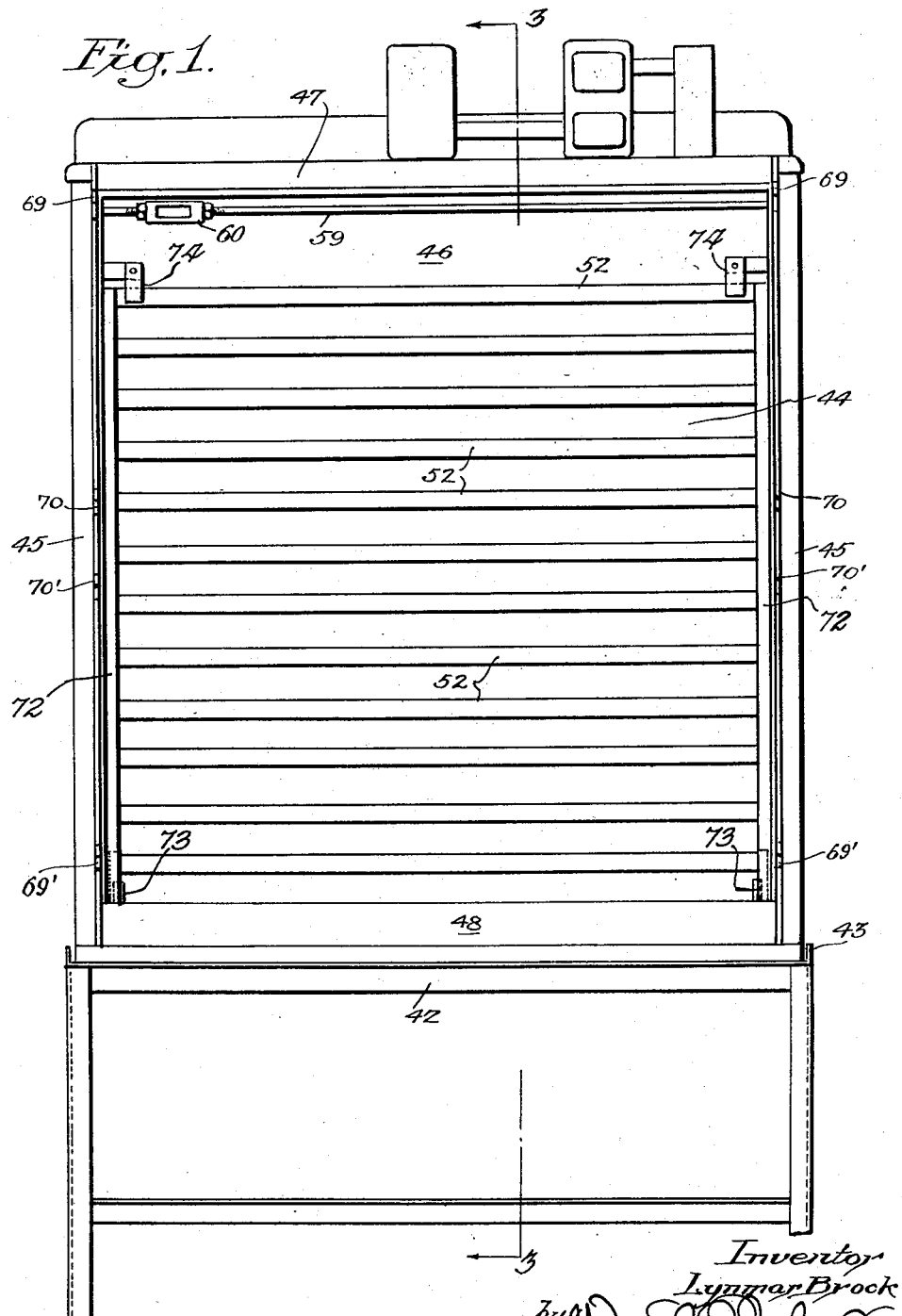
Figure 1 is a front elevation of the oven of the present invention.

Describing in illustration but not in limitation and referring to the drawings:

Particularly in connection with industrial plants, a serious problem is presented in serving hot food of high quality. Many plants are not of suitable size or layout to make operation of a conventional restaurant practical. In other cases the locations at which food service is desirable are so numerous that transportation of food from a central kitchen and maintaining of food in a palatable condition presents serious difficulties.

In accordance with the inventions described in my co-pending applications noted above, the food is partially cooked by conventional methods at a kitchen and then served in individual packages such as platters or the like, in individual servings of the various foods making up the course (in some cases the meal may have only one course) and finally distributed on the platters to the point of serving and there heated up and finally cooked.

The food in the first instance will be received and prepared. It then can be refrigerated prior to partial cooking although this step may in some cases be omitted. The prepared food will next be cooked to a partial extent. By this it is meant that a batch of vegetables will be cooked together, under the conditions suitable for cooking vegetables, whereas a cut of meat will be cooked independently under conditions for cooking meat. The same will apply to the other components of the meal.

The partial cooking will be carefully regulated so that the subject matter is not completely cooked. Usually the cooking will be incomplete by a time interval which is the same for all foods on a particular platter. For example, if the final increment of heating and cooking is to involve a thawing out and warm up period of 15 minutes and a cooking period of 15 minutes, the cooking of each of the items of food on the platter during the preliminary cooking stage will terminate 15 minutes before the food is done.

In choosing the relation between the preliminary cooking and the final cooking of food in the platter, it has been found that most satisfactory results from the standpoint of palatability of the food are obtained when the initial cooking accomplishes approximately 80 per cent of the complete cooking requirement. However, obviously this will not be the same in the case of all foods, since in the case of meats the initial cooking will probably be a fairly large proportion of the total cooking required, whereas in the case of vegetables the initial cooking may be a somewhat smaller proportion.

After the initial cooking, the food is served in individual servings on platters or in containers of other suitable type. Thus if the course is to consist of a meat and two vegetables, each platter will receive at this stage an individual serving of partially cooked meat and individual servings of two partially cooked vegetables. Other combinations may of course be employed.

Subsequent to the partial cooking, the food is deep frozen in the preferred embodiment. This deep freezing step has been found to be important in preserving the taste of the food. The preferred temperature is $-10°$ F. to $-20°$ F. although in some cases at this point temperatures 40° F. to $-10°$ F. are used. Subsequent to or as part of the deep freezing stage, the individual food servings, desirably placed in transportation containers, will be transported, normally under refrigeration.

The food will be taken out of refrigeration at the point of serving and placed in a heated cabinet or oven for final cooking. This final cooking will accomplish the function of thawing and heating up the food, and then afterward adding the additional cooking increment which was deliberately omitted during the original partial cooking. It has been found that the product is vastly superior from the standpoint of taste when a final cooking increment is accomplished immediately before serving, as compared with food which has merely been warmed up after complete cooking.

In order to eliminate the human error and assure satisfactory control, the final cooking is accomplished under automatic control of a time cycle device which turns on the electric heating of the oven automatically at a proper time interval before serving to allow for the final cooking increment, as well as the heating up, and which turns off the electric heating automatically at the time of serving.

After the final cooking stage is completed, the food is removed from the cabinet or oven at the point of serving and dispensed to the users.

It will be evident that where in a large industrial plant or other establishment it is desired to serve lunches at several buildings, a final cooking oven will be located at each point of serving and will automatically heat up at the proper time with respect to the final cooking interval.

The oven for heating up and finally cooking the food as shown in Figures 1 to 8 consists of a support 42 of suitable structural shapes having a retaining rim 43 which receives and supports an oven chamber 44 consisting of side walls 45, rear wall 46, a top 47, a bottom 48, and a door 49 consisting of an upper section 50 and a lower section 51. Within the oven chamber 44, a tier of shelves 52 is arranged vertically above one another, with a front air passage 53, a rear air passage 54 and a top air chamber 55.

The walls and doors consist of inner portions 56, outer portions 57 and heat insulation 58 between the outer and inner portions.

In order to secure the walls against buckling, a tension rod 59 (Figure 1) is tightened by a turn buckle 60.

The open positions of the doors are shown in dot and dash in Figure 3.

The door structure includes guideways 61 in the side walls which receive guiding ribs 62 on the ends of each door section. The front edge of each guideway 61 is limited by strips 63 which provide pin and notch support for the door sections in their respective positions. For example the pins 64 on the upper door section 50 engage in notches 65 when the door section is down or closed, the door section resting well back with the rib 62 against the rearward edge 66 of the guideway. For purposes of opening, the door section is simply grasped by the handle 67 and pulled upward and slightly forward so that the pins 64 leave the slots 65 and move up to and engage in the slots 68. As the pins seat in the slots 68, the door section again moves back, bringing the ribs 62 against the rearward edges 66 of the guideways 61. The limiting positions at the upward and downward extremes of movement of the door section 50 are provided by removable stops 69 and 70 which engage the pins 64 to prevent them from moving beyond the limits of slots 65 and 68. The guideways 61 prevent the pins from coming far enough forward to miss the stops 69 and 70.

The door section 50 meets another door section 51 at the interlocking seal line 71, the lower section moving downward to open in the same way that the upper section moves upward to open. Thus the pins 64' engage in slots 65' when the door is closed, but to open the door the pins are removed from the slot 65' and placed in the slots 68'. The stops 69' and 70' limit the door movement.

The individual shelves provide units which are united together into a shelf section by supports 72 adjoining the side walls. The shelf section is removably secured at the bottom by stops 73 which make tongue and slot connection with the shelf section and are locked at the top by suitable pivoted latches 74.

In operation, the food after preparing, refrigerating and partial cooking, will be placed in containers and deep frozen and stored, then transported under refrigeration to the point of serving, where it will be placed in the oven. The oven is desirably dimensioned so that 3 or 4 platters will fit on each shelf. The oven doors are then closed and the food is heated and the previously incomplete cooking is completed, after which the oven doors may be opened to remove the platters. It will be evident that either oven door may be opened or closed without reference to the other so that access can be had to food at the top or the bottom independently.

In view of my invention and disclosure variations and modifications to meet individual whim or particular need will doubtless become evident to others skilled in the art, to obtain all or part of the benefits of my invention without copying apparatus shown, and I, therefore, claim all such insofar as they fall within the reasonable spirit and scope of my claim.

Having thus described my invention what I claim as new and desire to secure by Letters Patent is:

In an oven door, walls forming a door space, vertical grooves on either side of the door space facing toward one another, and extending both above and below the door space, doors positioned one above another and in one position extending in front of and closing the door space, interlocking connections between the top of the lower door and the bottom of the upper door, a rib extending outwardly along each side of each door, into the adjoining door groove and narrower than the groove to permit the door to move frontwardly and backwardly, diagonally downwardly extending notches at the rear edge of each groove respectively above and below the door opening, and a pin extending outwardly on each side of each door, entering the adjacent groove and adapted to move into one of the notches.

LYNMAR BROCK.

REFERENCES CITED

The following references are of record in the file of this patent:

UNITED STATES PATENTS

| Number | Name | Date |
|---|---|---|
| 144,230 | Shontz | Nov. 4, 1873 |
| 221,793 | Davis | Nov. 18, 1879 |
| 392,630 | Myers | Nov. 13, 1888 |
| 729,026 | West | May 26, 1903 |
| 948,521 | Payne | Feb. 8, 1910 |
| 1,580,288 | Corbett | Apr. 13, 1926 |
| 1,726,794 | Anetsberger et al. | Sept. 3, 1929 |
| 1,754,096 | Gohmann | Apr. 8, 1930 |
| 1,815,607 | Beers | July 21, 1931 |
| 1,905,131 | Birdseye et al. | Apr. 25, 1933 |
| 2,131,367 | Blechman | Sept. 27, 1938 |
| 2,169,343 | Kaul | Aug. 15, 1939 |
| 2,180,797 | Cockerham | Nov. 21, 1939 |
| 2,238,963 | Bayer | Apr. 22, 1941 |